(No Model.) 4 Sheets—Sheet 1.

J. T. OBENCHAIN.
ROLLER MILL.

No. 334,460. Patented Jan. 19, 1886.

Witnesses:
W. A. Serrard.
John R. Woods.

Inventor
John T. Obenchain
by James W. See
Attorney

N. PETERS. Photo-Lithographer. Washington, D. C.

(No Model.) 4 Sheets—Sheet 2.
J. T. OBENCHAIN.
ROLLER MILL.
No. 334,460. Patented Jan. 19, 1886.
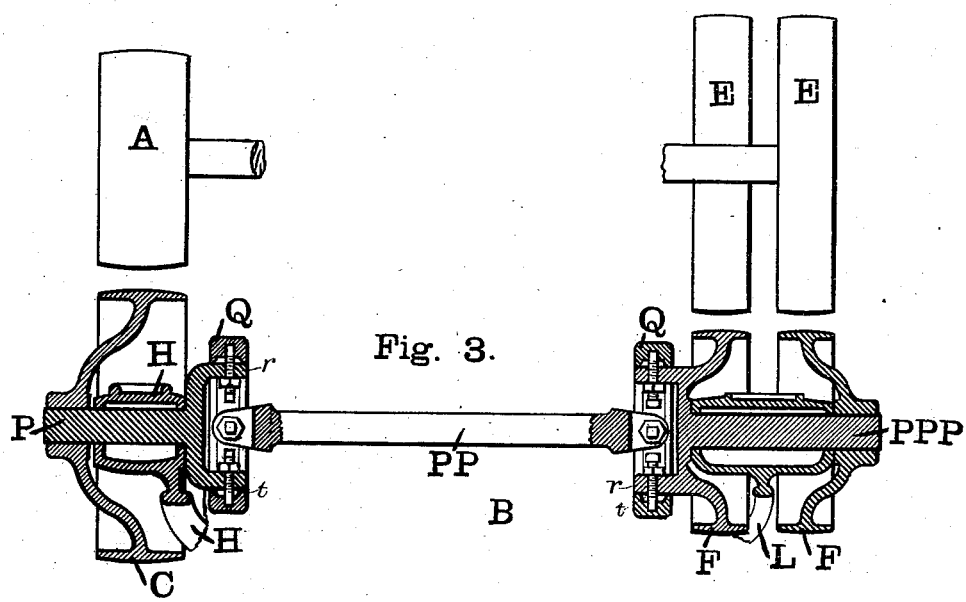
Fig. 3.
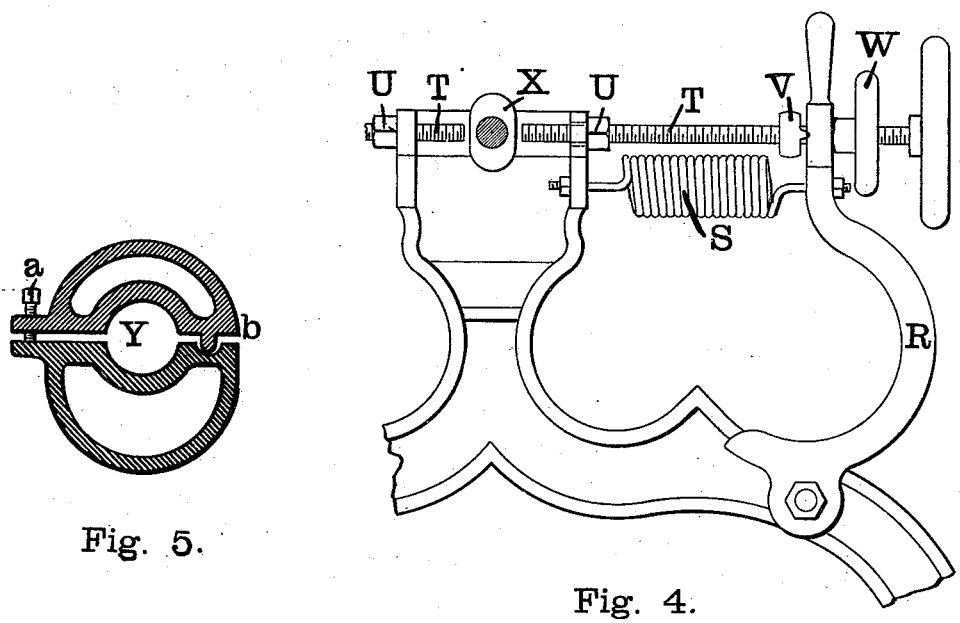
Fig. 5.
Fig. 4.
Witnesses:
John T. Obenchain, Inventor
by James W. See, Attorney (No Model.)

J. T. OBENCHAIN.
ROLLER MILL.

No. 334,460.  4 Sheets—Sheet 3.

Patented Jan. 19, 1886.

Witnesses:
W. A. Seward
John Albaods

John T. Obenchain  Inventor
by James W. See
Attorney (No Model.)

4 Sheets—Sheet 4.

J. T. OBENCHAIN.
ROLLER MILL.

No. 334,460. Patented Jan. 19, 1886.

Witnesses:
W. A. Bernard
A. B. Steen.

John T. Obenchain
by James W. See

Inventor

Attorney

UNITED STATES PATENT OFFICE.

JOHN T. OBENCHAIN, OF LOGANSPORT, INDIANA.

ROLLER-MILL.

SPECIFICATION forming part of Letters Patent No. 334,460, dated January 19, 1886.

Application filed June 22, 1885. Serial No. 169,403. (No model.)

*To all whom it may concern:*

Be it known that I, JOHN T. OBENCHAIN, of Logansport, Cass county, Indiana, have invented certain new and useful Improvements in Roller-Mills, of which the following is a specification.

This invention has reference to various features of construction of roller-mills, and will be readily understood from the following description, taken in connection with the accompanying drawings, in which—

Figure 2:
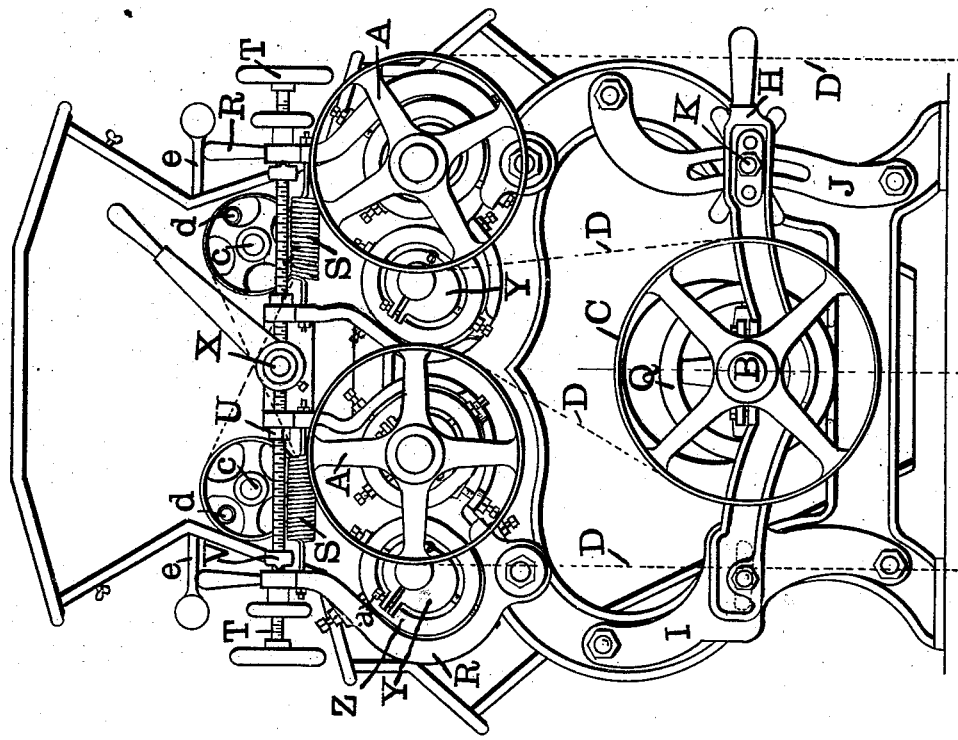
Figure 1:
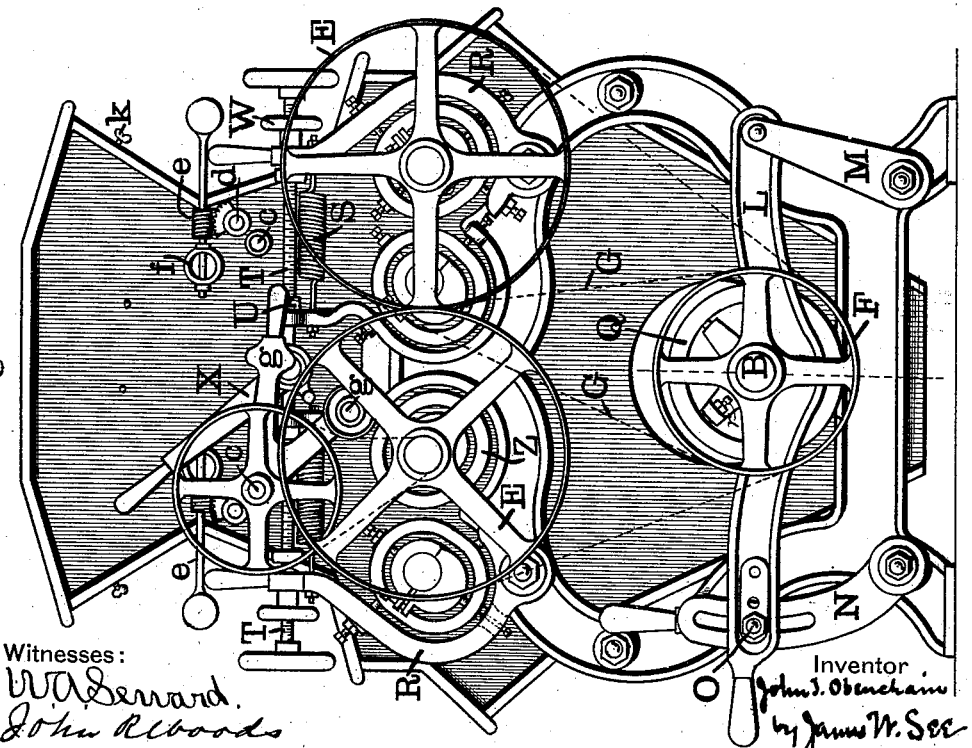
Figure 6:
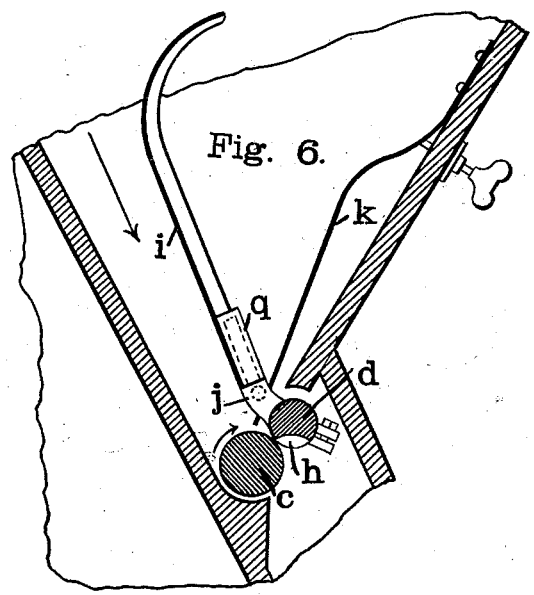
Figure 7:
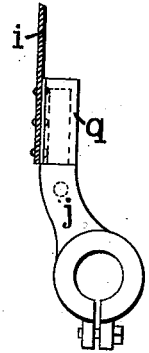
Figure 8:
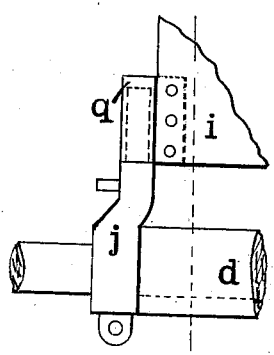
Figure 9:
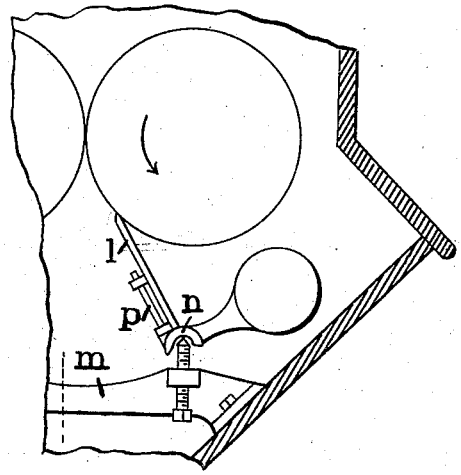
Figure 10:
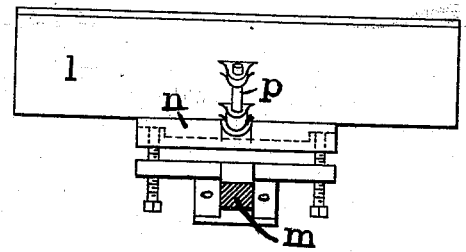
Figure 11:
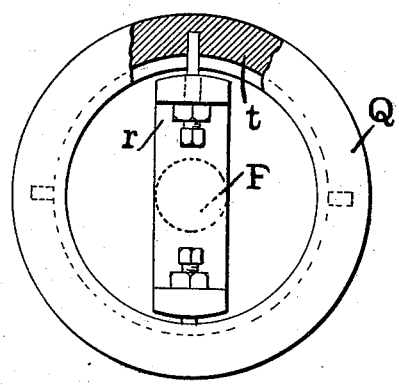
Figure 12:
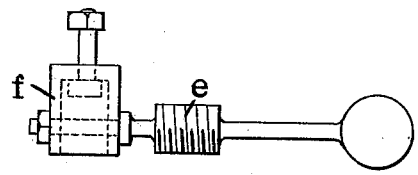
Figure 13:
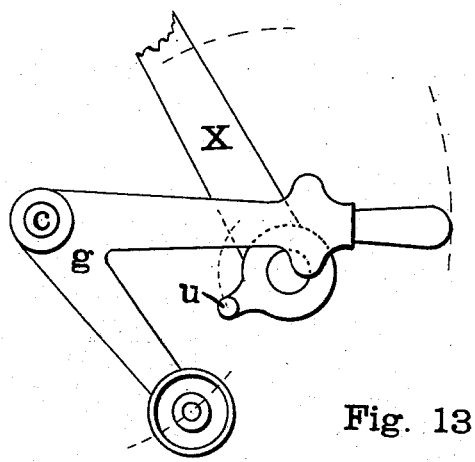

Figure 1 is a side elevation of my improved mill, showing what I will term the "transmitting side" of the mill; Fig. 2, a similar view of what I will term the "driving side" of the mill; Fig. 3, a vertical longitudinal section of the base-shafts B, the roll-pulleys being shown in elevation above; Fig. 4, an enlarged view of the upper right-hand portion of one of the side frames of the mill; Fig. 5, a vertical transverse section of one of the roll-boxes Y; Fig. 6, a vertical section, transverse xes of the rolls of the mill, of a portion of the feed-hopper, exhibiting the arrangement of a feed-roll, gate, &c., such view being upon a somewhat enlarged scale as compared with the previous figures; Fig. 7, a face view of one of the arms J of the feed-gate, a portion of the attached fender $i$ being shown in section; Fig. 8, a side elevation of a feed-gate, $d$, with one of said arms and a portion of the fender attached; Fig. 9, a vertical transverse section of the casing below one of the rolls, showing the arrangement of one of the roll-scrapers; Fig. 10, a side elevation of one of these roll-scrapers, its supporting-bridge being shown in transverse section; Fig. 11, an end view of the inner end of base-shaft P, with its attached coupling-ring, a portion of the latter being shown in section; Fig. 12, a plan of one of the worms $e$, with its rotary cup-bearing; and Fig. 13, a side elevation illustrating the arrangement of cam-lever X and lever $g$.

In this mill, which is a double roller-mill, a pair of side frames support in the same horizontal plane two pairs of rolls, a coupled series of shafts across the base of the mill, and a casing forming the feed-hopper and inclosure for the rolls. At one side of the mill a roll of each pair is provided with a pulley, both these pulleys being engaged by a driving-belt from below the floor, the same belt passing downward between these two pulleys and into engagement with a pulley on one of the base-shafts. This is the main driving-belt of the mill, and the side on which it is placed I term the "driving side," and it is illustrated in Fig. 2. At the other side of the mill the other two rolls have pulleys which are driven by two belts from pulleys on one of the base-shafts. This side of the mill I term the "transmitting side," and it is illustrated in Fig. 1. One roll of each pair is supported in a substantially fixed position by the frame, the other rolls being carried in pivoted levers and held to their work by adjustable swings. In the feed-hopper, above each pair of rolls, is arranged a revolving feed-roll operating in conjunction with an adjustable gate. Below each of the mill-rolls, within the casing, is arranged a scraper to keep it clear.

The construction thus mentioned in a general way is well known in the art, and the reader of this specification will be presumed to be fully acquainted with such construction.

My invention relates particularly to the improvements, which will be described in detail, and afterward pointed out in the claims.

I will first refer to improvements in the driving and transmitting mechanism. A represents two pulleys at the driving side of the mill, one on a roll of each pair of rolls; B, the coupled series of shafts at the base of the mill; C, a pulley on the base-shafting at the driving side of the mill; D, the main driving-belt, passing upward from below the floor around the two pulleys A and down around the pulley C; E, two pulleys at the transmitting side of the mill, one on a roll of each pair, the rolls thus provided being the ones not provided with pulleys at their other ends, the pulleys E being offset in order that their peripheries may clear each other; F, two pulleys on the transmitting end of the base-shafting; G, two belts at the transmitting side of the machine, serving to transmit motion from the base-shafting to the pulleys E; H, a lever at the driving side of the mill, pivoted indirectly by one end to the mill-frame, and provided at about its mid-length with a journal-box for one of the base-shafts, this journal-box projecting outward into the pulley C, whose arms are boldly dished, so as to make room for the box; I, a bracket rigidly bolted to the mill-frame at the driving side, and provided with a horizontal slot, in which is fulcrumed the pivot of the lever H, which pivot is rigidly fixed in the lever and free to slide in the slot, the bracket serving to carry the pivot supporting slot well out sidewise from the mill-frame; J, a somewhat similar outreaching bracket secured to the mill-frame at the other end of the lever H, and provided with a segmental slot whose arc is swept from the fulcrum-pivot of the lever which is supported by the bracket I; K, a bolt, which may be provided with a hand-nut, passing through one of the horizontal series of holes in the end of the lever H, and through the segmental slot of the bracket J; L, a lever similar to the lever H, but upon the transmitting side of the mill; M, a vertical arm pivoted to the base of the mill, and furnishing at its upper end the fulcrum-bearing for the lever L; N, a lever similarly pivoted to the base of the mill, and provided with a handle at its upper end, and with a segmental slot whose arc is struck from the fulcrum pivot of the lever L; and O a bolt, which may have a hand-nut, passing through any one of the horizontal series of holes in the end of the lever L, and through the slot of the lever N. The lever H at the driving side of the mill permits the base-shaft at the driving side of the mill to be raised and lowered and fixed at any desired point, whereby the driving-belt may be put in proper tension. In some cases the driving-belt D cannot be brought upward in true vertical lines, and it may then become desirable to shift the pulley C horizontally, in order that the pulley C may not come in contact with those portions of the belt D which pass angularly through the floor. This is done by putting the bolt K in the proper one of the holes of the lever, thus shifting the lever and its shaft horizontally, the fulcrum-pivot of the lever being at liberty to take its end position in the slot of its supporting-bracket. This side adjustment of the pulley C is a permanent adjustment, and is made once for all when the angle of the driving-belt has been determined. At the transmitting side of the mill the lever L enables me to adjust the pulleys F vertically, so as to properly strain the belts G, the operation for which is the same as that of straining the driving-belt upon the other side of the mill. On the transmitting side, however, there are two belts to strain by one adjustment, and one may require more straining than the other. This requires that the pulleys F shall be capable of a horizontal adjustment, which is liable to be needed at any time. The pivoting of the levers M and N permits a free end movement of the lever L, and when bolt O is loosened the lever L may be simultaneously adjusted vertically and horizontally until both of the belts G are under proper strain, after which the bolt O, being tightened, clamps the lever tightly and makes the entire lever structure rigid. The two handles upon the levers L and N render the double adjustment easy of accomplishment, and enable the results to be measured by that peculiar quality of feeling for which no proper substitute can be found. The lever L, instead of having its fulcrum carried in the pivot-lever M, may obviously have its pivot slide in a horizontal slot, the same as the lever upon the other side of the mill; but the lever M will be found to add much to the freedom and delicacy of the adjustment. The two pulleys F are of the same diameter, are on the same shaft, and revolve together at the same speed. Two separate belts lead from these pulleys to the roll-pulleys E above. A single broad pulley will perform the office of these two pulleys. The object, in the construction illustrated, in having two pulleys is to permit the lever L to be disposed between the planes of the two belts. The double-pulley arrangement is not at all essential. The rim of the inner pulley may, if desired, be extended outward, so that one broad pulley receives both belts, and the lever L may be curved to reach the box within the pulley, precisely as is done in the case of the lever H at the other side of the machine. I particularly call attention to this feature, as I wish it understood distinctly that I consider a single broad pulley adapted to operate the two belts as the mechanical equivalent of the two narrow pulleys referred to. The two pulleys form simply compounded pulleys. It is desirous that the adjustment independently of the two base-shafts shall not throw the base-shaft pulleys so much out of line as to interfere with the proper working of the belts. I provide against any disalignment of the belted work by so arranging the parts that either of the base-shafts may be adjusted without affecting in any degree the other. I articulate the base-shafts together, as seen in Fig. 3, in which P represents the driving one of the base-shafts carried by the box of the lever H, carrying the pulley C, and provided at its inner end with a fork, r, forming part of a universal joint; P P, the intermediate one of the base-shafts forked at each end; P P P, the transmitting one of the base-shafts, carried by the box of the lever L, carrying the two pulleys, F, which are internally dished so as to admit the box between them, and provided with a coupling-fork; and Q, universal coupling-rings disposed around the forks at each juncture. The base-shafts P and P P P have each a coupling-fork at their inner ends, and the base-shaft P P has a coupling-fork at each end. In the case of the base-shaft P P P, the coupling-fork, the base-shaft, and a pulley are cast in one piece. There are thus four similar coupling-forks, and these, with the two coupling-rings Q and their set-screws, form two universal couplings. Set-screws pass through the ends of the forks and engage in holes in the inner peripheries of the rings. Each ring has an interior circumferential channel or groove, t. Oil placed within the ring is kept in these grooves by centrifugal force, and serves to oil all of the screw-bearings. The coupling thus presents a fairly-smooth exterior and will not throw oil outward. It will be seen that the base-shafts, with their two universal joints, permit of one end shaft being adjusted without disturbing the other end shaft, and without disturbing the alignment of the belts. The lever L passes between the two pulleys F, and the inner one of the two pulleys is cast directly upon the fork of its part of the counter-shaft.

I will now refer to the means for supporting the roll-bearings, referring to Figs. 1, 2, and 4. Two of the rolls—one of each pair—are supported in the frame in a substantially fixed position, as usual, the other rolls being carried in boxes and adjustable levers, it being understood, of course, that the rolls are similarly provided at each side of the mill.

In the drawings, R represents the adjustable roll-bearing levers pivoted at their lower ends to the frame, and provided at their upper ends with handles; S, springs adjustable in tension by means of nuts upon the shanks of the springs serving to close the rolls; T, a screw connected to the upper end of the lever R, and having its inner end supported freely by the mill frame, and provided with a hand-wheel; U, a nut upon the screw T engaging against the mill-frame, and serving to limit the approach of the roll; V, a nut upon the screw T, provided with a horizontal knife-edge bearing impinging against the inner face of its lever; W, a hand-nut upon the screw T, serving, with the nut V, to clamp the lever R; and X, a cam provided with a hand-lever and pivoted to the mill-frame between the contiguous ends of two screws, T. The tension of the springs S may be adjusted to bring the proper closing force upon the rolls, and this tension may be tested at any time while the mill is working, or while the adjustment is being made, by pulling backward upon the handles at the top of the levers. The nut U serves as a rigid limiting-stop to the approach of the rolls, and it is the duty of the springs to simply maintain the movable roll in proper position, as determined by this stop, with sufficient force to prevent the separation of the rolls while properly at work, and at the same time to allow the rolls to automatically separate in case foreign matters seek to pass between them. Very little force is required to hold the rolls together; but it has been the custom to put the springs of roller-mills under an entirely uncalled-for amount of tension, simply because there was no provision for measuring the tension of the springs. The result has been that the rolls would not open freely enough to pass foreign hard matter without injury. I have discovered that if the springs of my mill are adjusted into such strain that the rolls cannot be freely opened by a pull upon the handle at the top of the lever R they are under unnecessary strain. I therefore adjust the springs until their strain, measured by the pull upon the handle, is sufficient for proper work, but not unduly excessive. I place the spring S below and entirely independent of the gage-screw T, so as to leave the same unencumbered by the presence of the spring. The nut U constitutes simply an abutting element for limiting the inward movement of the lever R. As the lever R oscillates the screw T is at liberty to partake of a hinge-like motion upon the knife-edge bearing of the nut V, and the nut W serves as a means for taking up all lost motion where the screw engages the lever. If the screw T had no other function than to carry the limiting-stop formed by the nut U, that nut, instead of being adjustable, might be fixed upon the screw, and the adjustment might be effected by moving the nuts V and W upon the screw. The ends of the screw T approach near to the cam X. When this cam is turned, the two screws are thrust apart and the rolls are quickly opened in an obvious manner. The cam acts upon the ends of the screws projecting beyond the nuts U, and the degree of this projection may be altered by adjusting the screw through all of the nuts. It is obvious that each side of the mill is to be provided with a roll-opening lever. Provision is made for permitting the bearing-boxes to align themselves upon their journals in the event of the mill not being squarely erected; for permitting the ends of the rolls to be adjusted vertically and independently, so that the two rolls of a pair may be brought into perfect parallelism, and for enabling the journal-boxes to be kept in a condition of closely fitting upon their bearings. The journal-boxes, instead of being rigidly supported in the frame and levers, are carried adjustably in gimbal-rings supported adjustably in the frame and levers.

In Figs. 1, 2, and 5, Y represents the journal-boxes, which have common self-oiling features, not necessary to describe, which are divided so as to form box and cap; Z, the gimbal-rings in which the boxes are supported upon the points of two oppositely-disposed set-screws, and which are themselves supported upon similar set-screws in the supporting part of the mill-frame and box-carrying levers; a, set-screws through ears on the box-caps and impinging against similar ears on the box-body; b, a round-edged rib upon the box-cap engaging in a groove in the box-body. The gimbal arrangement permits the two boxes of a roll to align themselves, and permits the opening motion of one end of the roll independent of the other end. The set-screws of the gimbal itself permit the rolls to be adjusted into parallelism with each other, and the set-screws impinging upon the journal-boxes serve not only as gimbal-pivots, but also as a means for closing the journal-boxes. The set-screws a serve to limit the closure of the boxes, so that a neat close fit upon the journal may be preserved without binding the journal, and the rib-and-groove feature at b endows one side of the box with a hinge-like action, so that the set-screws a are only needed upon one side. It will be seen from inspecting Figs. 1 and 2 that the lower set-screws, which are secured through the gimbal-rings supported in the levers R, appear to be obstructed by the levers. The levers are mortised, so as to permit these screws to have room.

I will now refer to the feeding and feed-regulating mechanism, referring to Figs. 1, 2, 6, 7, and 8. *c* represents the usual feed-rolls placed in the hopper-throat, one above each pair of rolls, and arranged to be driven by belt, as usual; *d*, a feed-gate in the form of a rotary cylindrical bar, with its periphery in or nearly in contact with the periphery of the feed-roll, and serving to normally prevent any outflow of grain, each of the gates being provided at one end exterior to the hopper with a segment of a worm-wheel; *e*, worms engaging these worm-segments and having their shafts extended outward, free from any bearing, and provided with enlarged extremities, forming at once handles and weights; *f*, rotary cups secured to the outer surface of the hopper and forming the bearings of the worm-shafts; *g*, (see Figs. 1 and 13,) a weighted lever pivoted to the journal of one of the feed-rolls exterior to the hopper, and carrying a tightening-pulley engaging the belt by which the feed-rolls are driven; *h*, a longitudinal cylindrical groove in each of the feed-gates, adapted, when the feed-gate is turned to proper position, to leave more or less gateway for the passage of grain between the feed-roll and gate; *i*, a sheet-metal fender secured to the gate and forming an adjustable partition across the feed-hopper parallel with a feed-roll; *j*, arms secured adjustably to the ends of the feed-gates, and each provided with a shank to serve in attaching the fender; *k*, adjustable springs secured to the feed-hopper and serving to press the fenders inward, so as to lessen the width of the compartment of the feed-hopper occupied by the inflowing grain; and *q*, sockets secured at each end of the fenders and engaging the shanks of the arms *j*.

In Fig. 1 it will be seen that one of the feed-rolls is driven by a belt from one of the mill-roll shafts, this belt being kept in working tension by the tightening-pulley on the lever *g*. This lever has a weighted handle, by which it may be lifted and the feed thus stopped by hand, and the hub of the cam-lever X is provided with a projection, *u*, which will lift the lever *g* when the roll-opening cam is operated. This feature is clearly shown in Fig. 13. Thus when the mill-rolls are opened the feed-rolls cease to revolve. The second feed-roll is driven by means of a belt from feed-roll to feed-roll, as shown in Fig. 2. When the worms *e* engage the worm-segments, as seen in Fig. 1, the worms may be revolved and the feed-gates turned to present at *h* any desired amount of gateway. The worms *e* are held into engagement with their worm-segments by gravity, and they may be turned up permanently out of engagement with the worms, and there retained by friction or by other suitable provision, the pivot-cups *f* forming the swiveling journals for these worms. When the worms are thus disengaged from the gates, the gates will obviously be turned, by the force of the springs *k*, into a position about as shown in Fig. 6, in which the gateway is entirely closed. Grain flowing into the hopper in the usual manner will now impinge against the fenders *i*, and these fenders will thus be opened outward, thus opening the gateway more or less. In this manner the amount of gate-opening is regulated by the rate at which grain is admitted to the hopper of the mill. The effect of the inflowing grain upon the fender is regulated by adjusting the tension of the spring *k* in an obvious manner, and the effect of the movement of the fender upon the rotation of the gate is effected by altering the annular position of the arms *j* upon the gate, so as to alter the relation which the plane of the fender bears to the gate-groove *h*.

The construction of the scraping devices is peculiar, and will now be referred to. Fig. 9 is an interior view of the mill-casing at a point below one of the rolls, showing one of the scrapers; and Fig. 10 is a face view of a scraper. *l* represents the scraper in the form of a blade as long as its roll, and provided at its center of length with drilled lugs; *m*, a bridge-piece across the casing transverse to the rolls and midway of their length, and provided below each roll with outwardly-projecting lugs provided with vertical set-screws; *n*, a gutter-shaped casting whose groove rests upon the set-screws of the bridge-piece, and which is provided with an outwardly-reaching weighted arm; *p*, a pin projecting upward from the weighted gutter-like casting through the lugs upon the face of the scraper. The scraper bears in the usual manner upon the rolls, and the scraper is at liberty to swivel upon the pin *p*, and thus find a fair parallel bearing upon the roll. The scraper structure fulcrums upon the set-screws, and the weight keeps the scraper in proper contact with the roll, while the set-screws permit the structure to be adjusted vertically, so as to alter the angle at which the scraper presents itself to the roll, and they also permit each end of the scraper to be independently adjusted vertically.

I claim as my invention—

1. In a roller-mill, the combination of a supporting-frame, two pairs of rolls supported thereby, a pulley upon the transmitting end of one roll of each pair, a base-shaft below said two pulleys, compounded pulleys F upon said base-shaft, a pulley on the driving end of each of the two other rolls, a horizontal lever disposed below the last-mentioned two pulleys and pivoted at one end to the mill-frame, a base-shaft supported in said lever and coupled to the base-shaft at the transmitting side of the machine, and a pulley upon the base-shaft at the driving side of the machine, substantially as and for the purpose set forth.

2. In a roller-mill, the combination of a supporting-frame, two pairs of rolls supported thereby, a pulley on the transmitting end of one roll of each pair, a base shaft disposed below said pulleys, compounded pulleys F upon said base-shaft, a pulley on the driving end of each of the other two rolls, a horizontal lever disposed below said last-mentioned pulleys and pivoted at one end to a fulcrum-slot, and provided at the other end with a tightening-bolt and a series of holes for the bolt, a base-shaft supported by said lever and coupled to the base-shaft at the transmitting side of the machine, and a pulley upon the base-shaft at the driving side of the machine, substantially as and for the purpose set forth.

3. In a roller-mill, the combination of a mill-frame, two pairs of rolls supported thereby, a pulley on the transmitting end of a roll of each pair, a base-shaft below said pulleys, compounded pulleys F on said base-shaft, brackets I and J, secured to the frame, lever H, bolt K, a base-shaft carried by said lever and coupled to the base-shaft at the transmitting side of the mill, and a pulley, C, upon the base-shaft at the driving side of the mill, substantially as and for the purpose set forth.

4. In a roller-mill, the combination of a mill-frame, two pairs of rolls supported thereby, a pulley on the transmitting end of a roll of each pair, a base-shaft below said pulleys, compounded pulleys upon said base-shaft, a pulley on the driving end of each of the other two rolls, slotted brackets I and J, lever H, bolt K, a base-shaft carried by said lever and coupled to the base-shaft at the transmitting side of the mill, and pulley C on the base-shaft at the driving side of the mill, substantially as and for the purpose set forth.

5. In a roller-mill, a supporting-frame, two pairs of rolls, a pulley on the driving end of one roll of each pair, a pulley on the transmitting end of each of the other rolls, a horizontal lever disposed below the last-mentioned pulleys and carrying a journal-box, a base-shaft carried in said journal-box, compounded pulleys F upon said base-shaft, and a base-shaft at the driving side of the mill, provided with a pulley and flexibly coupled to the base-shaft at the transmitting side of the mill, substantially as and for the purpose set forth.

6. In a roller-mill, the combination of a supporting-frame, two pairs of rolls, a pulley on the driving end of a roll of each pair, a pulley on the transmitting end of each of the other rolls, lever L, carrying a journal-box and having a shifting pivot, a base-shaft supported in such journal-box, compounded pulleys F upon such base-shaft, slotted lever N, bolt O, and a base-shaft at the driving side of the mill, provided with a pulley and coupled to the base-shaft at the transmitting side of the mill, substantially as and for the purpose set forth.

7. In a roller-mill, the combination of a mill-frame, two pairs of rolls, a pulley upon the driving end of a roll of each pair, a pulley upon the transmitting end of each of the other rolls, lever L, a base-shaft supported thereby, compounded pulleys F upon such base-shaft, levers M and N, bolt O, and a base-shaft at the driving side of the mill, provided with a pulley and coupled to the base-shaft at the transmitting side of the mill, substantially as and for the purpose set forth.

8. In a roller-mill, the combination of a mill-frame, two pairs of rolls, a pulley on the driving end of a roll of each pair, a pulley on the transmitting end of each of the other rolls, a horizontal lever provided with a handle and a shifting pivot and disposed below said last-mentioned pulleys, a series of coupled base-shafts, compounded pulleys F, pulley C, slotted lever N, provided with a handle, and a bolt engaging the two levers, substantially as and for the purpose set forth.

9. In a roller-mill, the combination of a mill-frame, two pairs of rolls, a pulley on the driving end of one roll of each pair, a pulley on the transmitting end of each of the other rolls, a series of coupled base-shafts, compounded pulleys F, pulley C, lever L, provided with a handle, lever M, slotted lever N, provided with a handle, and a bolt, O, substantially as and for the purpose set forth.

10. In a roller-mill, the combination of two pairs of rolls, a supporting-frame, two pulleys at the driving side of the mill, one upon a roll of each pair, two pulleys at the transmitting side of the mill, one upon a roll of each pair, two levers, one disposed at each side of the mill below said pulleys, and each carrying a journal-box, two base-shafts, each provided with forks, and one carried in each of said journal-boxes, and an intermediate base-shaft reaching between the before-mentioned base-shafts, substantially as and for the purpose set forth.

11. In a roller-mill, the combination, with roll-pulleys, coupled series of base-shafts, base-shaft pulleys, and base-shaft-supporting levers, of coupling-forks at the couplings of the base-shafts, coupling-rings encircling said forks, and set-screws secured in said forks and engaging outwardly into said coupling-rings, substantially as and for the purpose set forth.

12. In a roller-mill, the combination, with rolls, roll-pulleys, coupled series of base-shafts, base-shaft pulleys, and base-shaft-supporting levers, of coupling-forks at the couplings of the base-shafts, set-screws in said forks projecting outwardly, and coupling-rings encircling the forks and provided with interior oil-grooves and screw-bearings, substantially as and for the purpose set forth.

13. In a roller-mill, the combination of the rolls and roll-pulleys, coupled base-shafts, compounded pulleys F on the transmitting base-shaft, outwardly-dished pulley C on the driving base-shaft, and lever H, provided with a base-shaft box disposed within said dished pulley, substantially as and for the purpose set forth.

14. In a roller-mill, the combination of rolls and roll-pulleys, base-shafts P and P P P, provided with coupling-forks at their inner ends, base-shaft section P P, provided at each end with integrally-formed coupling-forks, pulley C, and compounded pulleys F, substantially as and for the purpose set forth.

15. In a roller-mill, the combination of rolls and roll-pulleys, pulley C, base-shafts P and P P, base-shaft P P P, two dished pulleys, F, and lever L, provided with a base-shaft box disposed within said pulleys, substantially as and for the purpose set forth.

16. In a roller-mill, the combination of a mill-frame, a roll supported in the frame, a lever pivoted to the frame at each side of the mill and provided with a roll-bearing, a roll supported in said bearings, adjustable springs to hold the levers in working position, adjustable stops to fix the working position of the levers, and testing-handles upon said levers, substantially as and for the purpose set forth.

17. In a roller-mill, the combination of a mill-frame, a roll supported thereby, levers R, provided with roll-boxes, a roll supported in said boxes, stop-screws T, and springs S, disposed below the stop-screws, substantially as and for the purpose set forth.

18. In a roller-mill, the combination of a frame provided with boxes for a grinding-roll, and having rigid portions projecting above the roll, levers pivoted to such frame and provided with roll-boxes, grinding-rolls supported in said frame, and levers, springs attached to the levers and to said upwardly-projecting frame portions, and screws articulated to the levers and engaging such frame portions, substantially as and for the purpose set forth.

19. In a roller-mill, a mill-frame provided with roll-boxes and having rigid portions projecting above the rolls, levers pivoted to the frame and provided with roll-boxes, rolls supported in the roll-boxes, springs attached to the levers and to said upwardly-projecting frame portions, and stop-screws articulated to the said levers and having their inner ends supported by said upwardly-projecting frame portions, and a nut upon each of said screws abutting against such frame portions, combined substantially as and for the purpose set forth.

20. In a roller-mill, the combination of a mill frame and rolls, levers carrying the movable roll-boxes, springs for holding the levers in working position, cams to serve in opening the rolls, fixed portions of the mill-frame contiguous to the cams, screws reaching from the levers to a position to be engaged by the cams, and nuts upon the screws to serve as adjustable abutments against said fixed portions of the mill-frame, substantially as and for the purpose set forth.

21. In a double roller-mill, the combination, with a mill frame and rolls, of levers R, springs S, screws T, with their ends in contiguity, nuts U abutting upon fixed portions of the mill-frame, and cams X, provided with hand-levers and disposed between the contiguous ends of said screws, substantially as and for the purpose set forth.

22. In a roller-mill, the combination, with a mill frame and rolls, of levers R, springs S, provided with means for the adjustment of their tension, cam-levers X, screws T, projecting through the levers and through fixed portions of the mill-frame, nuts U for adjusting the projection of said screws through said frame portions, nuts V upon one side of said levers, and nuts W upon the other side of said levers, substantially as and for the purpose set forth.

23. In a roller-mill, the combination of a pair of rolls, a feed-roll, weighted lever $g$, pivoted at the feed-roll and carrying a tightening-pulley adapted to engage the feed-belt and be held into action by said weighted lever, roll-opening cam-lever X, and projection $u$ upon the hub of such cam-lever adapted to engage beneath the lever $g$ and lift said tightening-pulley out of action, substantially as and for the purpose set forth.

24. In a roller-mill, the combination of a pair of mill-rolls, a feed-roll, $c$, a grooved gate, $d$, provided at one end with a worm segment or wheel, a pivot-bearing, $f$, and a worm, $e$, journaled in such bearing and provided with a weighted handle, substantially as and for the purpose set forth.

25. In a roller-mill, the combination of a pair of mill-rolls, a revolving feed-roll, a grooved gate, $d$, a fender, $i$, secured to the gate, and a spring, $k$, substantially as and for the purpose set forth.

26. In a roller-mill, the combination of a pair of mill-rolls, a revolving feed-roll, a gate, $d$, provided with groove $h$, a fender, $i$, secured to the gate and fitted to be adjusted axially thereon, and spring $k$, substantially as and for the purpose set forth.

27. In a roller-mill, the combination of a pair of mill-rolls, a revolving feed-roll, grooved gate $d$, arms $j$, provided with shanks, fender $i$, and sockets $q$, substantially as and for the purpose set forth.

28. In a roller-mill, the combination of a mill-roll, a central scraper-support disposed below the roll, a pair of vertical set screws in said support, a gutter-piece, N, provided with a weight and resting upon the points of said screws, and a scraper, $l$, attached to the gutter-piece, substantially as and for the purpose set forth.

29. In a roller-mill, the combination of a mill-roll, a rigid support secured below the roll, a central pin, $p$, horizontally pivoted to said support, and a scraper, $l$, pivoted to said pin, substantially as and for the purpose set forth.

30. In a roller-mill, the combination of a mill-roll, a scraper-support, $m$, provided with vertical set-screws, a weighted gutter-piece, $n$, resting upon the set-screws and provided with a pin, $p$, and a scraper, $l$, pivoted to said pin, substantially as and for the purpose set forth.

JOHN T. OBENCHAIN.

Witnesses:
 JOSEPH HALLANAN,
 R. J. FORGY.